United States Patent [19]

Kim

[11] Patent Number: 5,635,991
[45] Date of Patent: Jun. 3, 1997

[54] COLOR SIGNAL PROCESSING SYSTEM FOR A COLOR TELEVISION RECEIVER

[75] Inventor: Dong H. Kim, Taegu, Rep. of Korea

[73] Assignee: Goldstar Co., Ltd., Seoul, Rep. of Korea

[21] Appl. No.: 399,096

[22] Filed: Mar. 3, 1995

[30] Foreign Application Priority Data

Mar. 3, 1994 [KR] Rep. of Korea .................. 94-4131

[51] Int. Cl.$^6$ .................................................. H04N 5/14
[52] U.S. Cl. ...................... 348/630; 348/625; 348/628
[58] Field of Search ........................... 348/630, 631, 348/625, 628

[56] References Cited

U.S. PATENT DOCUMENTS

5,053,865  10/1991  Ubukata .................. 348/631

Primary Examiner—Glenton B. Burgess
Attorney, Agent, or Firm—Oppenheimer Poms Smith

[57] ABSTRACT

A color signal processing system for a color television receiver which can improve the transition characteristic of a color difference signal, using the transition region of a luminance signal. The system includes a differentiator for differentiating the transition region of an input luminance signal, and a color difference signal processor for processing an input color difference signal by controlling the transition region of the color difference signal in accordance with the differentiated luminance signal. Thus, the transition characteristic of the color difference signal is compensated for in proportion to the transition characteristic of a luminance signal.

10 Claims, 8 Drawing Sheets

| Y'd | M0 | M1 | M2 | M3 | M4 | M5 | M6 | M7 |
|---|---|---|---|---|---|---|---|---|
| 0 ~ ref | 0 | 0 | 0 | 0 | 0 | 0 | 0 | 0 |
| ~ (A-ref)$\frac{1}{8}$ | 1 | 0 | 0 | 0 | 0 | 0 | 0 | 0 |
| ~ (A-ref)$\frac{2}{8}$ | 0 | 1 | 0 | 0 | 0 | 0 | 0 | 0 |
| ~ (A-ref)$\frac{3}{8}$ | 0 | 0 | 1 | 0 | 0 | 0 | 0 | 0 |
| ~ (A-ref)$\frac{4}{8}$ | 0 | 0 | 0 | 1 | 0 | 0 | 0 | 0 |
| ~ (A-ref)$\frac{5}{8}$ | 0 | 0 | 0 | 0 | 1 | 0 | 0 | 0 |
| ~ (A-ref)$\frac{6}{8}$ | 0 | 0 | 0 | 0 | 0 | 1 | 0 | 0 |
| ~ (A-ref)$\frac{7}{8}$ | 0 | 0 | 0 | 0 | 0 | 0 | 1 | 0 |
| ~ (A-ref) | 0 | 0 | 0 | 0 | 0 | 0 | 0 | 1 |

COLOR SIGNAL PROCESSING SYSTEM FOR A COLOR TELEVISION RECEIVER

BACKGROUND OF THE INVENTION

1. Technical Field

The present invention generally relates to color signal processing. More particularly, the present invention relates to a color signal processing system for a color television receiver which improves a transition characteristic of a color difference signal, using a luminance signal whose transition region has been differentiated.

2. Description of the Prior Art

Figure 1:
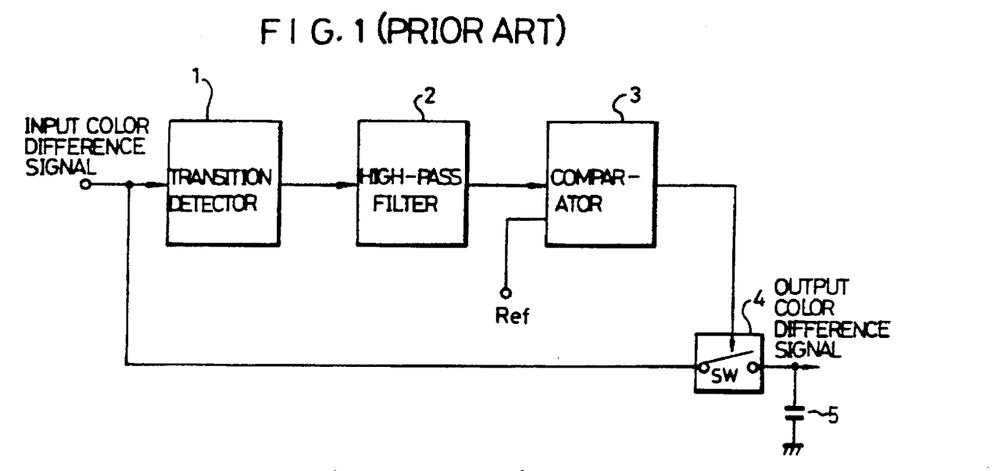
FIG. 1 is a block diagram of a conventional color signal processing system.

A conventional color signal processing system, referring to FIG. 1, has a transition detector I for differentiating a transition region of an input color difference signal and for outputting a signal proportional to the slope of the differentiated signal, a high-pass filter 2 for high-pass-filtering the differentiated color difference signal, a comparator 3 for comparing the output from the high-pass filter 2 with a reference signal, a switch 4 for switching the input color difference signal by a signal from the comparator 3, and a capacitor 5 for charging or discharging the color difference signal through the switch 4.

The operation of the conventional color signal processing system will be described with reference to FIG. 2.

Figure 2:
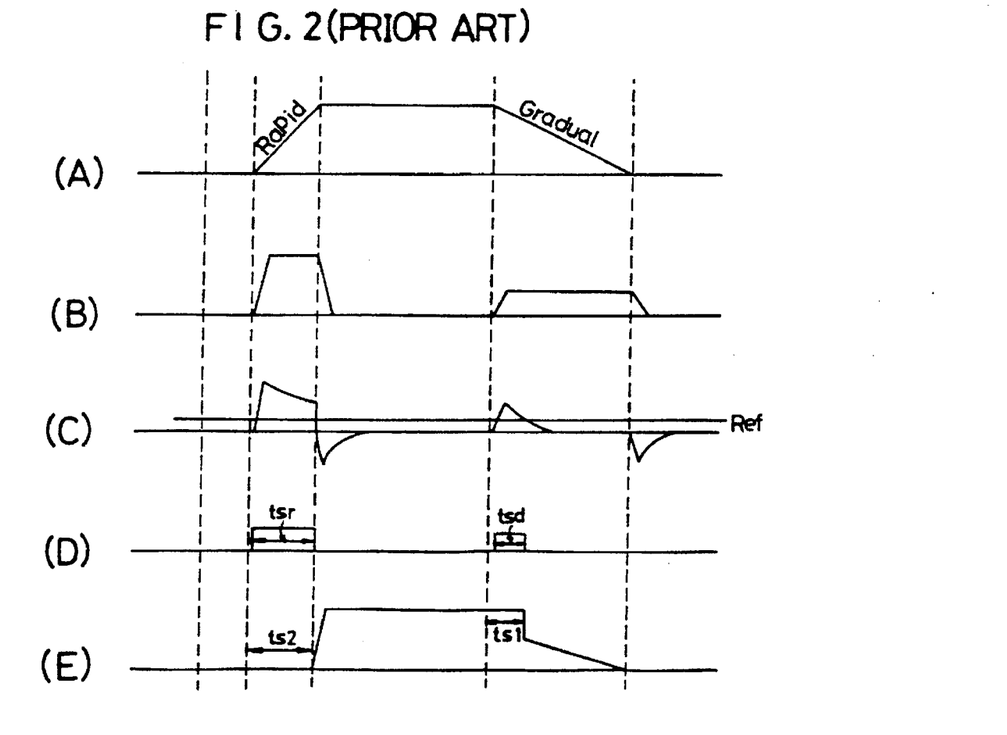
FIG. 2 shows waveforms appearing on parts of FIG. 1.

If a color difference signal, as a waveform (A) shown in FIG. 2, is provided to the transition detector 1, the transition detector 1 differentiates the color difference signal and outputs a signal proportional to the slope of the transition of the color difference signal, as a waveform (B) in FIG. 2.

The high-frequency component of the differentiated signal from the transition detector 1 is filtered at the high-pass filter 2, and provided to the comparator 3.

The comparator 3 compares, as a waveform (C) in FIG. 2, the filtered signal with in a given reference signal (Ref), and provides a resulting value, as a waveform (D) in FIG. 2, to the switch 4 as a switch control signal.

The switch 4 is opened during the period where the switch control signal remains in a high state, as marked as 'tsr' and 'tsd' in the waveform (D), while it is closed during the rest of the period.

As a concrete example, during the rapid transition, shown as the waveform (A) In FIG. 2, the switch 4 is opened. At this time a voltage previously charged in the capacitor 5, i.e. a previous value before the transition is output. The switch 4 is closed at the end of the transition, and then the input color difference signal is directly output through the closed switch path.

Whereas during the gradual transition, shown as the waveform (A) in FIG. 2, the switch 4 is opened only at the period of 'ts1', and the value which has been being charged in the capacitor is output.

Figure 3:
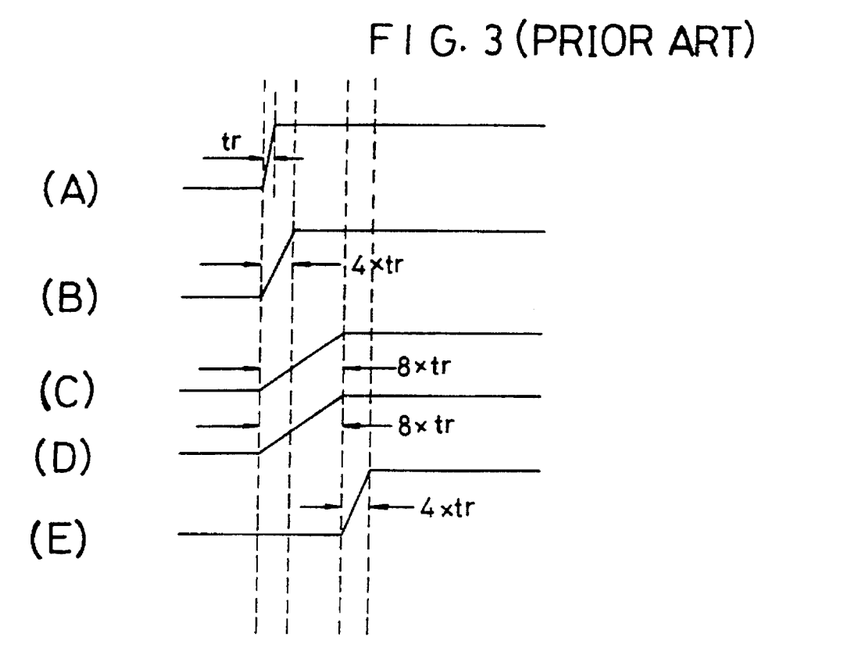
FIG. 3 shows waveforms explaining a problem of conventional system.

FIG. 3 shows as an example that the transition time of an input color difference signal is 8 times as long as a luminance signal when providing the waveforms (A) to (C) as a luminance signal, the waveform (D) as an input color difference signal, and a waveform (E) as an output color difference signal processed by a color signal processing system.

Accordingly, if the transition time of a luminance signal and of a color difference signal, which are different from each other, are accorded with each other as waveform (D) in FIG. 3 and if the color difference signal is treated by a color signal processing system, a color difference signal having the same transition time, as waveform (E) in FIG. 3, as a luminance signal is attained.

However, since a color difference signal has been treated without regard to the transition characteristic of a luminance signal in such a conventional color signal processing system, accurate treatment of a color difference signal cannot be achieved at the transition region of a luminance signal on account of the difference of the transition region of a luminance signal from that of a color difference signal.

That is to say, it is not suitable to represent the resolution wherein the frequency band-width of a color difference signal is less than 0.5 MHz (t=0.35/0.5 MHz), because a color difference signal is used for a yardstick for compensation for the transition characteristic.

SUMMARY OF THE INVENTION

This invention is to avoid such a problem, which provides a color signal processing system for a color television receiver capable of improving a transition characteristic of a color difference signal, using a luminance signal whose transition region has been differentiated.

In accordance with the present invention, there is provides a color signal processing system for a color television receiver, comprising:

means for differentiating a transition region of an input luminance signal; and means for processing an input color difference signal by controlling a transition characteristic thereof in accordance with the differentiated signal from the differentiating means,

BRIEF DESCRIPTION OF THE DRAWINGS

These and other features, aspects, and advantages of the present invention will become better understood with regard the following description, appended claims, and accompanying drawings where:

DETAILED DESCRIPTION OF THE PREFERRED EMBODIMENT

Figure 4:
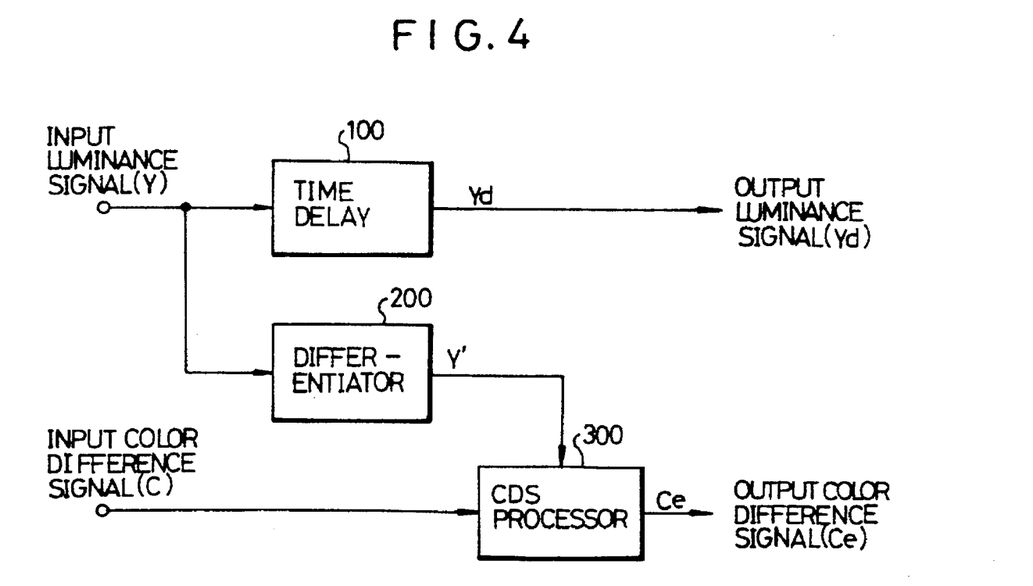
FIG. 4 is a block diagram of a color signal processing system according to the present invention.

FIG. 4 shows a block diagram of a color signal processing system of the present invention. It comprises a time delayer 100 for delaying at regular time an input luminance signal, a differentiator 200 for differentiating the transition region of the luminance signal, and a color difference signal processor 300 for processing an input color difference signal by controlling a transition characteristic thereof, using the differentiated signal from the differentiator 200.

In the drawings, the color difference signal processor 300 is represented as a 'CDS processor' far briefness, and will be referred to as such throughout this description.

Figure 5:
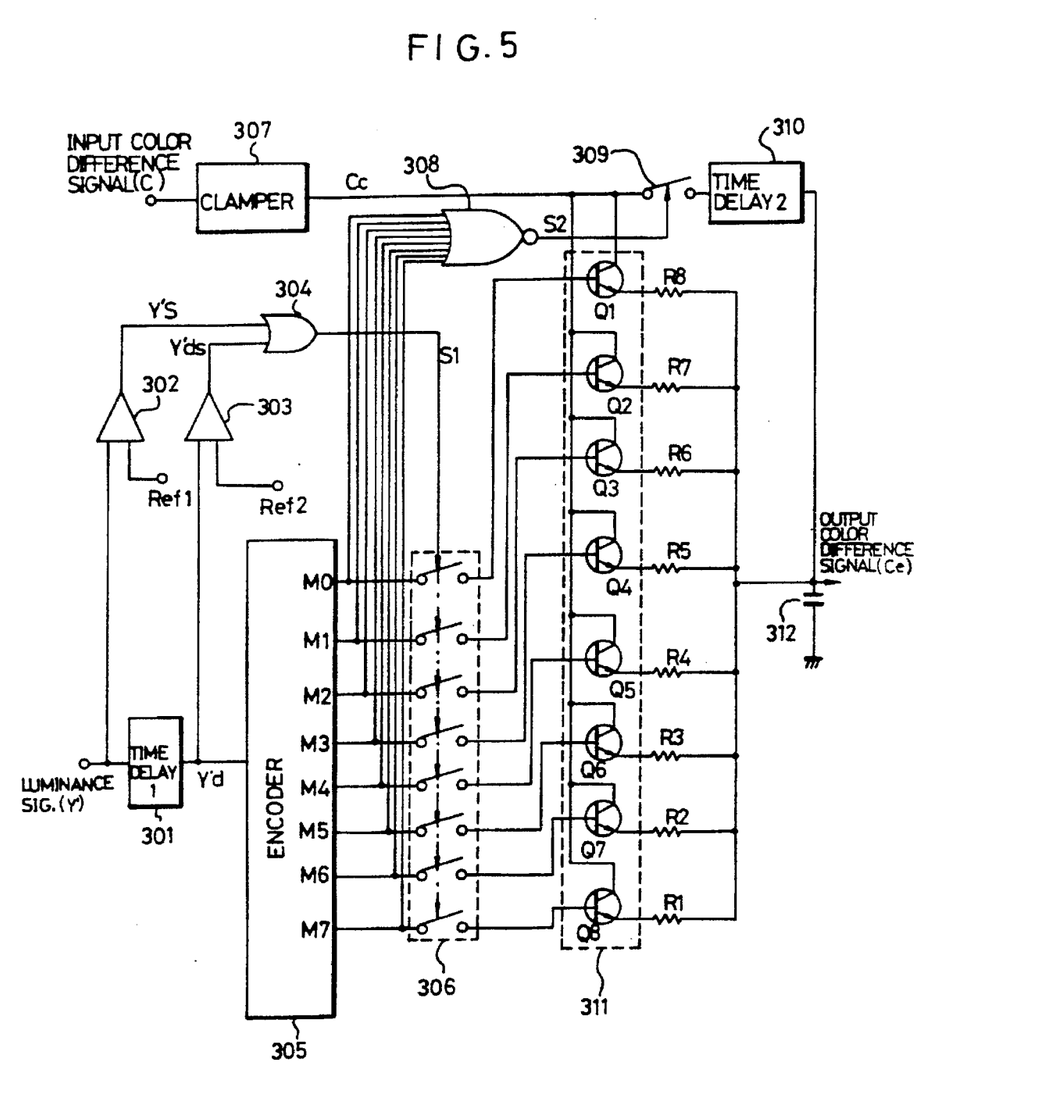
FIG. 5 is a detailed circuitry of a color difference signal (CDS) processor in FIG. 4.

The CDS processor 300 is, according to FIG. 5, composed of: a first time delayer 301 for delaying at regular time a differentiated luminance signal Y' from the differentiator 200; a first comparator 202 for comparing the differentiated luminance signal Y' with a given reference signal Ref1; a second comparator 303 for comparing the delayed luminance signal Y'd from the first time delayer 301 with a given reference signal Ref2; an OR gate 304 for ORing the signals from each of the first and second comparator 302 and 303 and for outputting as a switch control signal the resulting value; an encoder 305 for encoding the output signal from the first time delayer 301; a first switching section 306 employing eight switches for switching the encoded signal from the encoder 305, using the switch control signal from the OR gate 304; a clamper 307 for clamping an input color difference signal; a NOR gate 308 for NORing the encoded signals from the encoder 305 and for outputting as a switch control signal the resulting value; a switch 309 for switching the output signal from the clamper 307, using the output from the NOR gate 308; a second time delayer 310 for delaying the signal passing through the switch 309; a second switching section 311 employing transistors Q1 to Q8, each of which is for switching the signal from the clamper 307, under the control of the signals from the first switching section 306; and a capacitor 312 for charging or discharging both the signal through one of the resistors R1 to R8 in the second switching section 311 and the signal from the second time delayer 310.

The operation of such a constructed system will be discussed with reference to FIGS. 4 to 15 as follows.

An input luminance signal Y is delayed 8xtr (=0.35/4 Hz=87.5 nsec) by the time delayer 100. It is output as a delayed luminance signal Yd.

The differentiator 200 differentiates the transition region of the luminance signal Y, and provides it to the CDS processor 300. The CDS processor 300 processes an input color difference signal C by using the differentiated luminance signal Y'.

Explaining the CDS processor 300 more in detail, as shown in FIG. 5, the differentiated luminance signal Y' is provided both to the first comparator 302 and to the first time delayer 301.

The first time delayer 301 delays the differentiated luminance signal Y' as much as 8xtr (87.5 nsec), and provides it both to the encoder 305 and to the second comparator 303.

Accordingly, the first and second comparator 302 and 303 compare the input signal Y' and Y'd with the reference signals Ref1 and Ref2, respectively. The resulting values Y's and Y'ds are provided to the input pins of the OR gate 304.

The OR gate 304 ORes the two signals, and provides the resulting value as a switch control signal to the first switching section 306.

Figure 6:
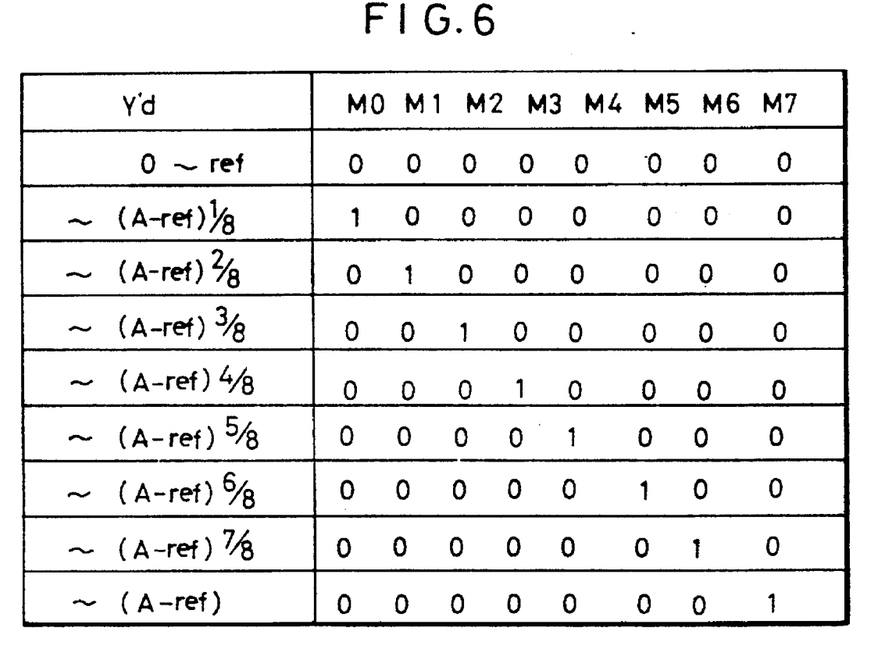
FIG. 6 is a table showing relationship between the input and output of an encoder in FIG. 5.

The encoder 305 encodes as shown in FIG. 6 the 8xtr delayed luminance signal Y'd. A set of the encoded signal is provided to the first switching section 306. The first switching section 306 switches the encoded signal train by the switch control signal from the OR gate 304, and provides it as a transistor control signal to the second switching section 311.

In the mean time, a color difference signal C is clamped by the clamper 307 and is provided to the second time delayer 310 through the switch 309. The switch 309 is controlled by the signal resulting from the NOR gate 308's NORing the encoded signal train from the encoder 305.

That is, only when all of the output (M0–M7) of the encoder 305 are 0, the output of the NOR gate 308 goes 'high' to close the switch 309. At the remaining states, the switch 309 is opened.

The signal through the switch 309 is delayed as much as 8xtr at the second time delayer 310 and is stored to the capacitor 312. To this capacitor 312 also, a clamped color difference signal through the resistor corresponding to a turned-on transistor is applied. Accordingly the capacitor 312 makes a compensated color difference signal Ce from the two signals.

The exemplary operation of compensation for a color difference signal is as follows.

Figure 7:
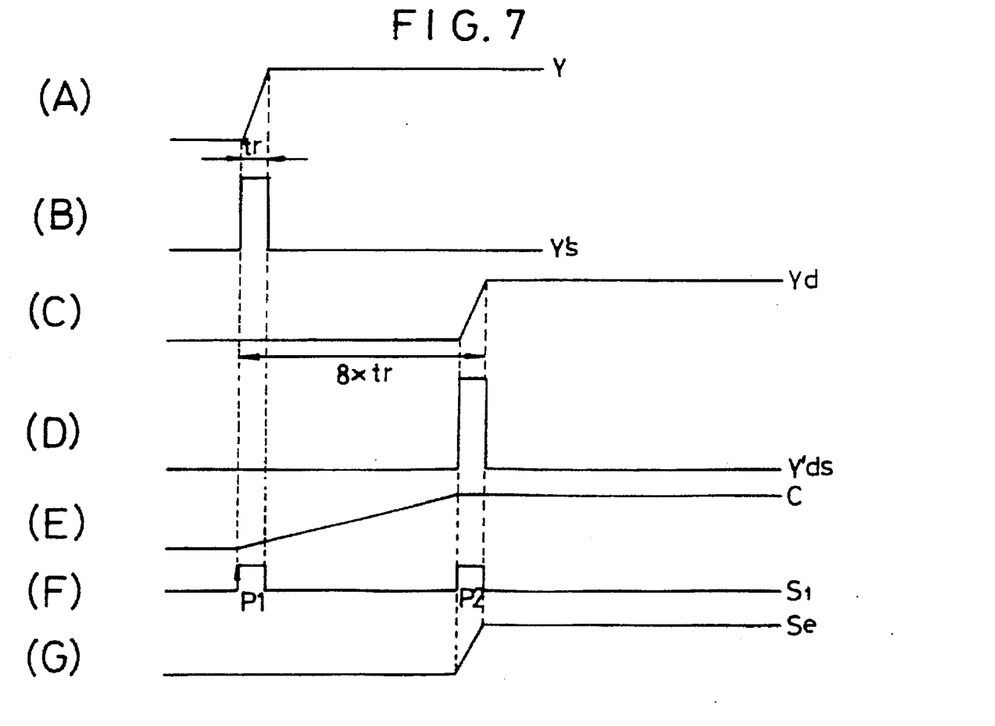
FIG. 7 through FIG. 15 are timing diagrams explaining the operation of a circuit depicted in FIG. 5.

If the transition time of the input luminance signal Y is 'tr' as waveform (A) in FIG. 7, this signal Y is delayed as much as 8xtr at the time delayer 100. The delayed luminance signal Yd is output like waveform (C) in FIG. 7. The transition region of the luminance signal Y is differentiated by the differentiator 200 and is provided to the CDS processor 300 as a differentiated luminance signal Y'.

The CDS processor 300 delays the differentiated luminance signal Y' as much as 8xtr (Y'd) by the first time delayer 301 and provides it both to the encoder 305 and to the second comparator 303.

Simultaneously the differentiated luminance signal Y' is provided to the first comparator 302, and is compared with the reference signal Ref1. The first comparator 302 outputs a waveform Y's as waveform (B) in FIG. 7, which remains in a 'high' state only at the transition region of the signal Y, as a resulting value.

In addition, the second comparator 303 compares the 8xtr delayed differentiated luminance signal Y'd with the reference voltage Ref2. The second comparator 303 outputs a waveform Y'ds, as waveform (D) in FIG. 7, which remains 'high' state only at the transition region of the signal Yd, as a resulting value.

These signals Y's and Y'ds are ORed at the OR gate 304. The output, like waveform (F) in FIG. 7, of the OR gate 304 is applied to the first switching section 306 so that the switches in this section 306 can be controlled only at the transition region of the luminance signal Y'.

The encoder 305 encodes the 8xtr delayed luminance signal Y'd. As an example at this time, because the transition time of this luminance signal Y'd is 'tr', the output becomes, as shown in FIG. 6, '00000001', This signal train '00000001' is provided to the switches in the first switching section 306, respectively. The first switching section 306 opens the switches at the rising edge of the first pulse P1, while closes them at the rising edge of the second pulse P2, using the output, as waveform (F) in FIG. 7 from the OR gate 304.

The signal train '00000001' is also provided to the NOR gate 308. It is NORed there and the output becomes 'low', and thus the switch 309 is opened.

Meanwhile, if all of the switches in the first switching section 306 are closed, because the signal entering the second switching section 311 is '00000001', only the transistor Q8 is turned on.

Accordingly, the color difference signal Cc which has been clamped by the clamper 307 is applied to the capacitor 312 through the emitter and collector of the transistor Q8 and the corresponding resistor R1. The capacitor 312 charges this signal Cc and outputs a compensated color difference signal Ce like waveform (G) in FIG. 7.

So far it has been discussed in the case that the transition time of a luminance signal is 'tr'. But because the transition time differs from luminance signal to luminance signal, there are depicted other drawings FIG. 8 to FIG. 15 showing the operation timing in each case.

Figure 8:
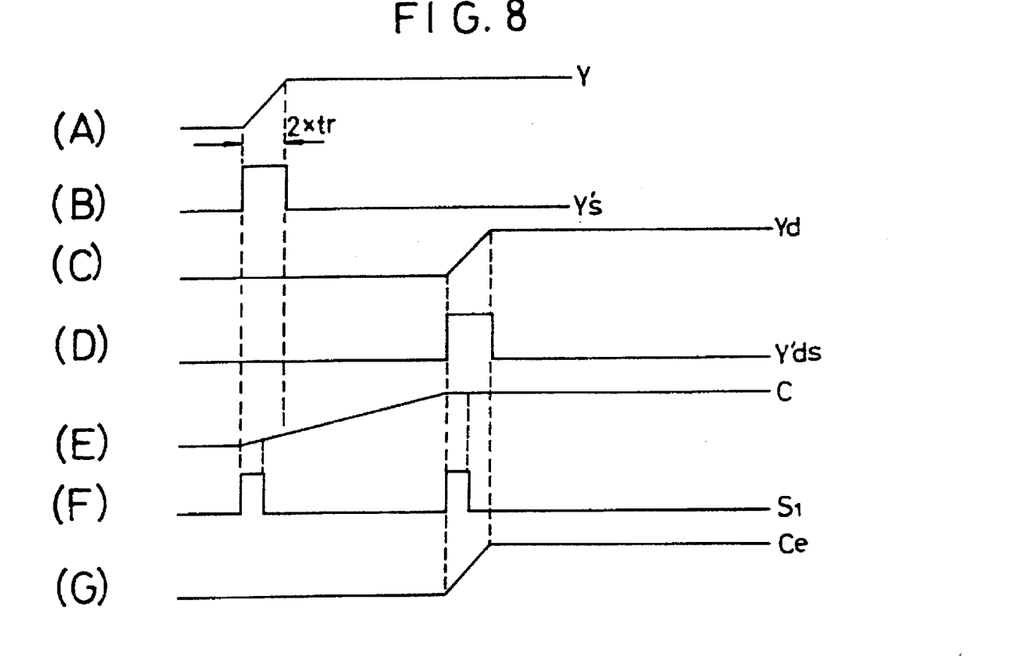
Figure 9:
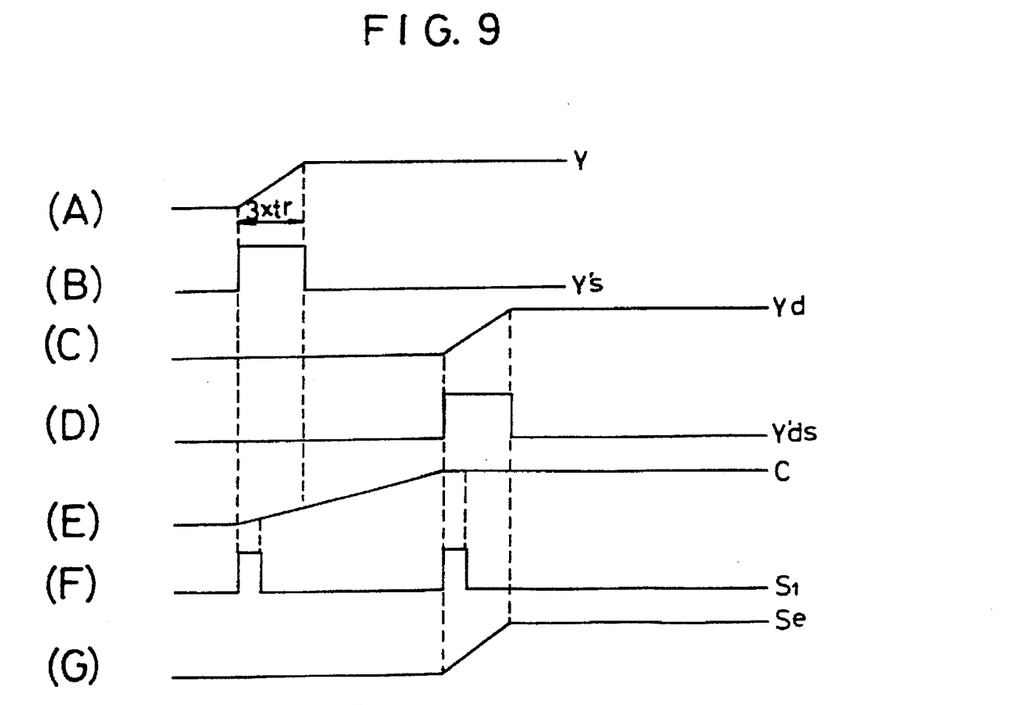
Figure 10:
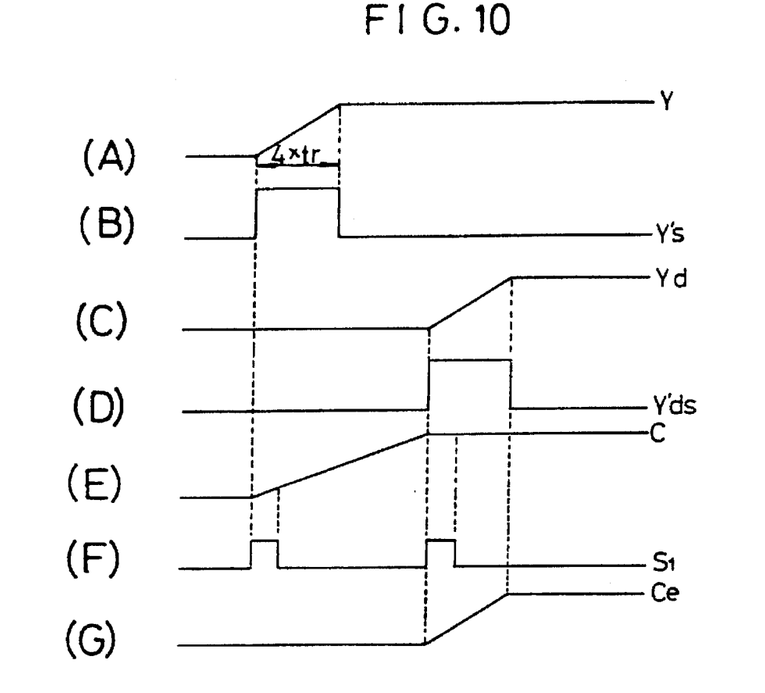
Figure 11:
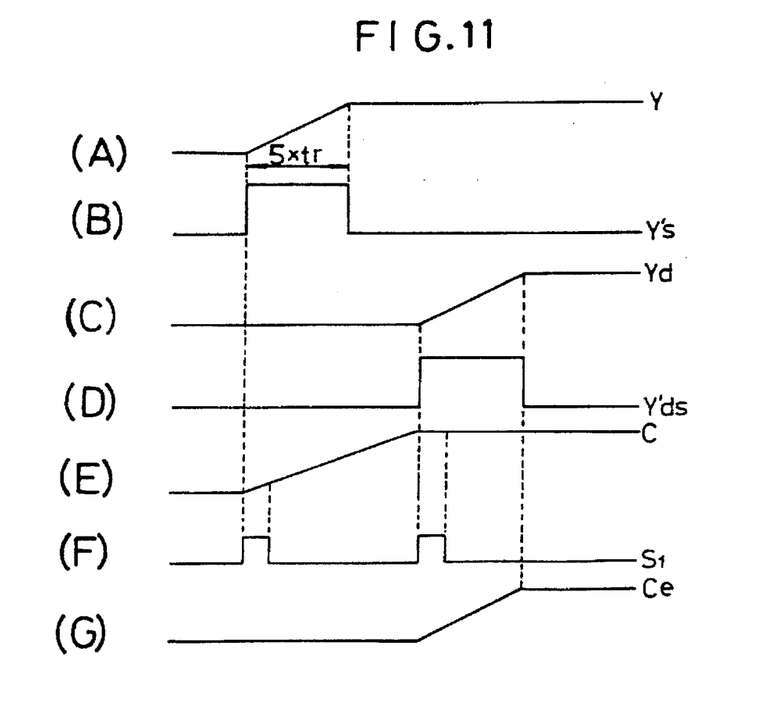
Figure 12:
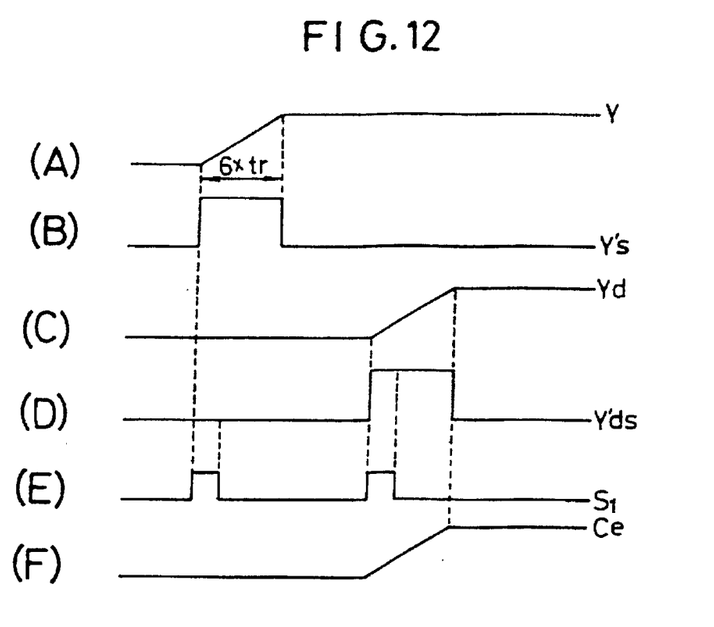
Figure 13:
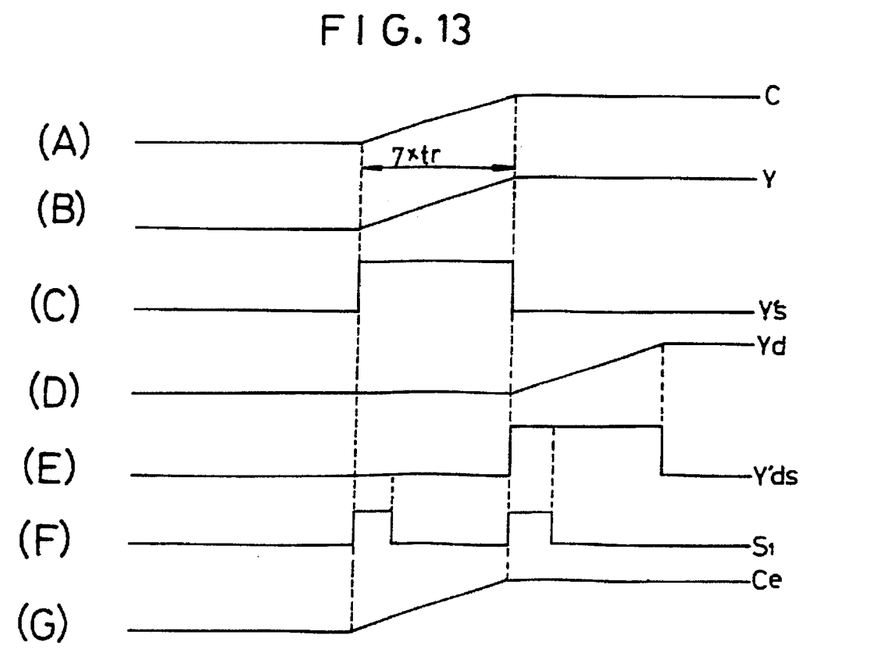
Figure 14:
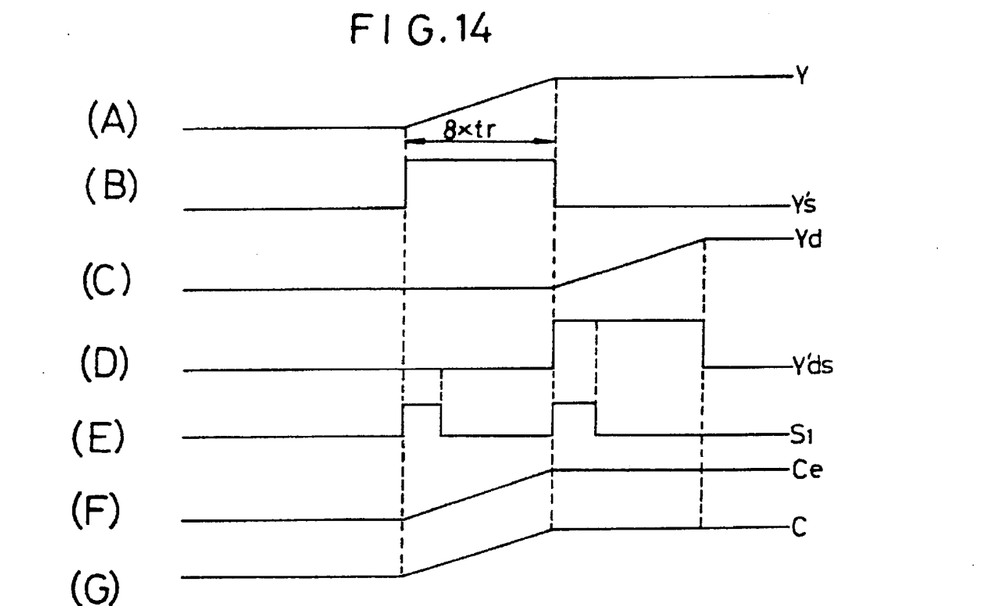

Their operations will be omitted because they are similar to the aforementioned one. FIG. 8 is the case that the transition time Γ is 2xtr, FIG. 9 Γ=3xtr, FIG. 10 Γ=4xtr, FIG. 11 Γ=5xtr, FIG. 12 Γ=6xtr, FIG. 13 Γ=7xtr, and FIG. 14 Γ=8xtr.

Figure 15:
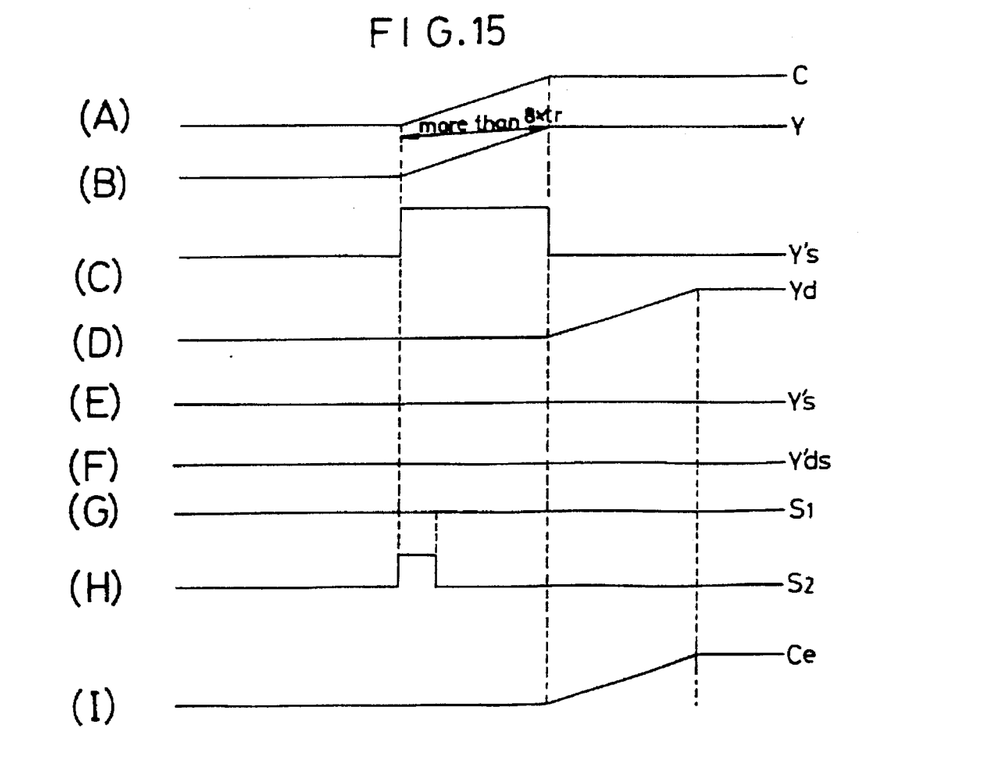

If Γ>8dxtr, the color difference signal C also follows the transition characteristic of the luminance signal, as shown in FIG. 15.

That is to say, a luminance signal Y like waveform (B) in FIG. 15 is delayed as much as 8xtr, as waveform (D) in FIG. 15, by the time delayer 100. And the transition region of this signal Y is differentiated by the differentiator 200 and provided to the CDS processor 300.

In the CDS processor 300, the differentiated luminance signal Y' is provided to the first time delayer 301 and also the first comparator 302.

The first time delayer 301 delays it as much as 8xtr and provides it to the encoder 303 and also to the second comparator 303.

The first comparator 302 compares this with the reference signal Ref1. At this time because the differentiated luminance signal Y', is, as waveform (c) in FIG. 15, under the reference signal Ref1, the output of the first comparator 302 becomes 'low' like waveform (E) in FIG. 15.

As both the output of the first and second comparator 302 and 303 become 'low', the output of the OR gate 304 becomes also 'low' and thus the switches in the first switching section 306 are opened.

Meanwhile, the 8xtr delayed luminance signal is encoded by the encoder 305. Because the transition time Γ is more than 8xtr, the encoder 305 outputs a set of '00000000' as shown in FIG. 6.

Therefore, the output of the NOR gate 308 which remains 'high' only at the transition region, like waveform (H) in FIG. 15, closes the switch 309.

Accordingly, a color difference signal C as waveform (A) in FIG. 15 is clamped by the clamper 307 and passes through the switch 309 to reach the second time delayer 310. This signal Cc is delayed as much as 8xtr at the second time delayer 310 and is applied to the capacitor 312.

The capacitor 312 discharges the signal, like waveform (I) in FIG. 15, analogous to the input color difference signal. That is, if the transition time of the input luminance signal is more than 8xtr, a color difference signal is output without any compensation.

In the drawings, the relationship between the unexplained numerals R1 to R8 is R1<R2<R3<R4<R5<R6<R7<R8. As illustrated in FIG. 6, the greater the magnitude of delayed luminance signal Y'd, the higher the number of the output pin M0–M7 which will be set to logic "1". Because R1<R2<R3<R4<R5<R6<R7<R8, which transistor Q1–Q8 in FIG. 5 is turned on From the foregoing, according to the present invention, the transition characteristic of a color difference signal is compensated for to meet the transition characteristic of a luminance signal, and thereby the resolution wherein the frequency band-width of a color difference signal is under 0.5 MHz (t=0.35/0.5 MHz) can be achieved.

What is claimed is:

1. A color signal processing system for a color television receiver, comprising:

means for differentiating a transition region of an input luminance signal; and means for processing an input color difference signal by controlling a transition characteristic thereof in accordance with said differentiated signal from said differentiating means, and by additionally controlling said transition characteristic in accordance with a delayed version of said differentiated luminance signal, said processing means comprising:

a first time delayer for delaying at regular time said differentiated luminance signal;

a first comparator for comparing said differentiated luminance signal with a predetermined reference signal;

a second comparator for comparing an output from said first time delayer with a predetermined reference signal;

a first switch controller for providing a switch control signal in accordance with signals from said first and second comparators;

an encoder for encoding an output from said first time delayer;

first switching means for switching the output from said encoder in accordance with the switch control signal from said first switch;

second switching means for switching the input color difference signal under the control of said first switching means;

a second switch controller for providing a switch control signal in accordance with output signals of said encoder;

a switch for switching the input color difference signal under the control of said second switch controller;

a second time delayer for delaying at regular time the color difference signal passing through said switch; and a capacitor for providing a compensated color difference signal, charging or discharging the outputs from said second time delayer and said second switching means.

2. The system according to claim 1, wherein said first switch controller is an OR gate.

3. The system according to claim 1, wherein said second switch controller is a NOR gate.

4. The system according to claim 1, wherein said second switching means comprises:

a plurality of transistors; and a plurality of resistors having different resistance values, respectively, for delivering the color difference signal from each said transistors to said capacitor.

5. The color signal processing system defined in claim 1, wherein:

said second switching means comprises a plurality of transistors, each transistor having said color difference signal as an input, each transistor further having an output and an associated series gain determining resistor connected in series to said output, each gain determining resistor providing an input to said capacitor; and said output from said encoder comprises a plurality of encoder output lines, a maximum of one encoder output line being active at a time, each encoder output line communicating through said first switching means with one of said transistors within said second switching means, such that a maximum of one of said transistors and associated resistor is active at a time.

6. A color signal processing system for a color television receiver, comprising:

means for differentiating a transition region of an input luminance signal; and means for processing an input color difference signal by controlling a transition characteristic thereof in accordance with said differentiated luminance signal from said differentiating means, said processing means comprising:

a time delayer for delaying said input color difference signal;

a selectable gain coefficient element for applying a selected gain coefficient to said input color difference signal; and a capacitor for providing a compensated color difference signal, charging or discharging the outputs from said time delayer and said selectable coefficient gain element.

7. A color signal processing system as defined in claim 6, wherein said selectable coefficient gain element comprises:

a plurality of switching means for switching said input color difference signal, each said switching means including an associated gain element, each said switching means being individually controlled in accordance with said input luminance signal.

8. A color signal processing system as defined in claim 7, wherein each said gain element comprises a resistor.

9. A color signal processing system as defined in claim 8, wherein said resistors have unequal resistance values.

10. The color signal processing system defined in claim 6, wherein:

said selected gain coefficient is chosen according to the value of said differentiated luminance signal, with a greater gain coefficient corresponding to a greater differentiated luminance signal value.

* * * * *